(12) United States Patent (10) Patent No.: US 6,787,712 B2
Asai et al. (45) Date of Patent: Sep. 7, 2004

(54) COMBINATION WEIGHING APPARATUS HAVING A SUPPLY UNIT

(75) Inventors: Yoshiharu Asai, Shiga (JP); Minoru Kubokawa, Shiga (JP); Masaaki Iwamoto, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 90 days.

(21) Appl. No.: 09/906,152

(22) Filed: Jul. 17, 2001

(65) Prior Publication Data

US 2002/0020567 A1 Feb. 21, 2002

(30) Foreign Application Priority Data

Jul. 24, 2000 (JP) ........................................ 2000-221871
May 28, 2001 (JP) ........................................ 2001-158809

(51) Int. Cl.[7] ........................................... G01G 19/387
(52) U.S. Cl. ...................... 177/25.18; 177/54; 177/104; 177/145; 222/56
(58) Field of Search ................................ 177/25.18, 90, 177/98, 99, 103, 104, 119–122, 105, 52–57, 145; 222/56

(56) References Cited

U.S. PATENT DOCUMENTS 4,418,772 A * 12/1983 Fukuda ..................... 177/25.18
4,421,185 A * 12/1983 Koto et al. ............... 177/25.18
4,720,961 A * 1/1988 Jordan ...................... 177/25.18
4,821,820 A * 4/1989 Edwards et al. ......... 177/25.18
5,270,495 A * 12/1993 Mosher et al. ........... 177/25.18

FOREIGN PATENT DOCUMENTS

| DE | 4306245 A1 | 9/1994 |
| EP | 0982570 A2 | 3/2000 |
| JP | 59-36031 | 2/1984 |

\* cited by examiner

*Primary Examiner*—Randy Gibson
(74) *Attorney, Agent, or Firm*—Staas & Halsey LLP

(57) ABSTRACT

To provide a combination weighing apparatus capable of handling articles of various shapes automatically at a high speed, the combination weighing apparatus includes a supply unit (2) having a plurality of supply buckets (20$i$) each capable of discharging the article onto hoppers (40$i$) positioned therebelow. The supply buckets (20$i$) are drivingly supported by a transport unit including an endless support member (10) so as to circulate along a predetermined transport path. A discharge control is provided so that when some of the supply buckets (20$i$) are brought to a position corresponding to empty weighing hoppers (40$i$), the articles M within such supply buckets (20$i$) can be discharged therefrom onto the weighing hoppers (40$i$).

15 Claims, 9 Drawing Sheets

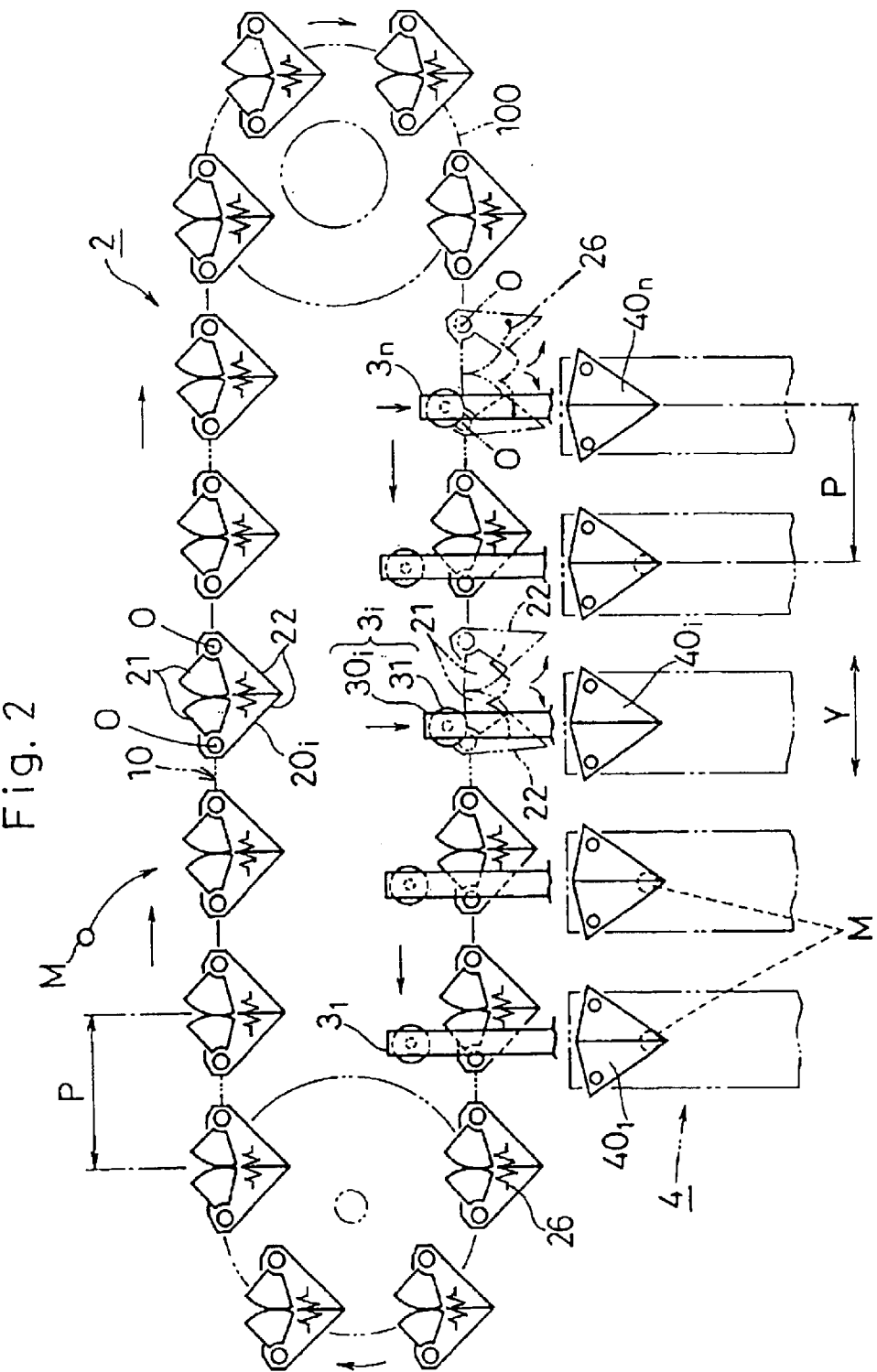

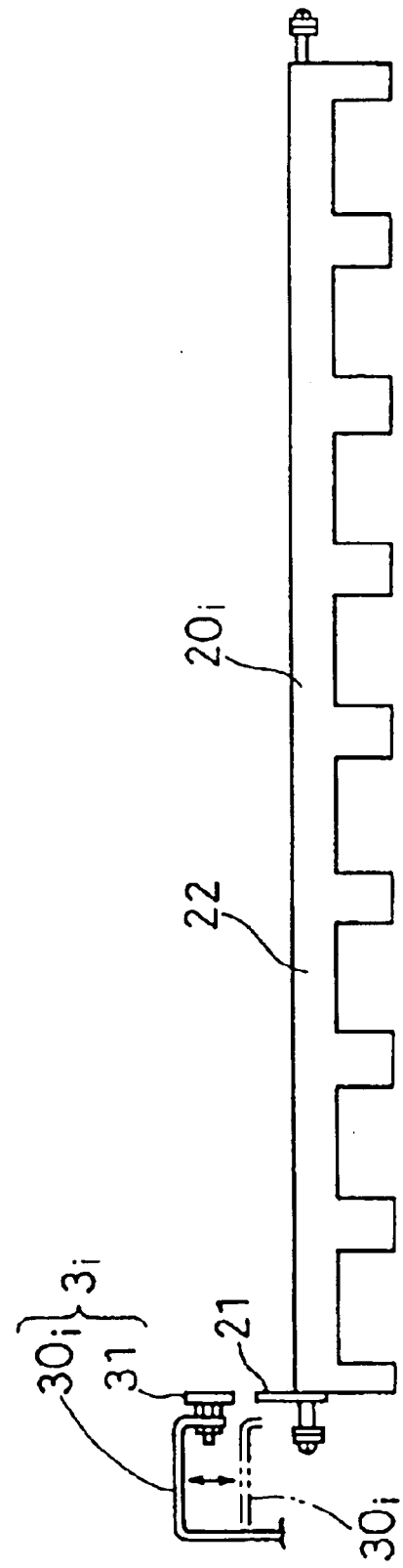

| ITEMS | COMBINATION TARGET VALUE Tc | STANDARD WEIGHT Wa | THRESHOLD VALUE Ws |
|---|---|---|---|
| SCALLIONS (LARGE) | 220g | 52g | 148g |
| SCALLIONS (SMALL) | 90g | 11g | 77g |
| LEEKS | .. | .. | .. |
| BURDOCKS | .. | .. | .. |

COMBINATION WEIGHING APPARATUS HAVING A SUPPLY UNIT

BACKGROUND OF THE INVENTION

1. Field of the Invention

The present invention relates to a combination weighing apparatus having a plurality of hoppers arranged in a rectilinear row.

2. Description of the Prior Art

The combination weighing apparatus is known which is operable to a combine articles together after the articles have been weighed by a plurality of weighing hoppers. Where the articles difficult to be automatically delivered due to the shape and/or nature of the articles, a so-called in-line combination weighing apparatus wherein the weighing hoppers are arranged in a rectilinear row is generally utilized to facilitate a manual delivery of the articles. Also, since the in-line combination weighing apparatus is effective in that the articles are weighed and delivered as supplied in an aligned fashion, it is generally used for weighing elongated articles. The manual delivery operation performed with the in-line combination weighing apparatus includes delivery of the articles onto empty weighing hoppers after an operator watching the articles being handled has determined such weighing hoppers having been emptied. On the other hand, automatic delivery includes transportation of the articles by means of a belt conveyor and vibrating the belt conveyor so that the articles can be dispensed onto the weighing hoppers from a downstream end of the belt conveyor. See, for example, the Japanese Laid-open Patent Publication No. 59-36031.

However, manual delivery of the articles onto some of the weighing hoppers which the operator determine with his or her naked eyes that they are emptied requires the operator to look around a number of sites and, therefore, not only is an error in delivery likely to occur, but high speed automation is difficult to achieve.

On the other hand, with the prior art in which automated delivery is performed using the belt conveyor as hereinbefore discussed, the shape of the articles that can be supplied is limited. By way of example, where the articles are elongated in shape such as, for example, scallions or burdocks, the articles cannot be generally delivered onto the weighing hoppers in an aligned fashion with ease and, for this reason, the articles cannot be discharged in an aligned fashion.

Also, with the prior art in which automated delivery is performed, since the belt conveyor is vibrated in a horizontal place to allow the articles to be successively delivered downwardly from the downward end of the belt conveyor, delivery pitch can hardly be speeded up, resulting in inefficient utilization of the handling capacity of the combination weighing apparatus.

SUMMARY OF THE INVENTION

Accordingly, an important object of the present invention is to provide an improved combination weighing apparatus which is versatile enough to handle articles of various shapes and which can be automated to operate at a high speed.

In order to accomplish the foregoing object of the present invention, the present invention in accordance with one aspect thereof provides a combination weighing apparatus for weighing articles supplied to a plurality of hoppers, arranged in a rectilinear row, from a supply unit, combining some of the hoppers and grouping together the articles within selected ones of the hoppers. The supply unit includes a plurality of supply buckets each capable of accommodating an article therein and discharging it onto the hoppers; transport means including an endless support member for drivingly supporting the supply buckets and operable to circulate the supply buckets along a predetermined path together with the support member past a discharge position above the row of the hoppers; determining means for determining, in reference to a weight of the article within each of the hoppers, whether or not the respective hopper is ready to receive the article; and discharge control means for, when the supply buckets are successively brought to a position corresponding to some of the hoppers ready to receive the articles therefrom, causing the supply buckets to discharge the corresponding articles onto such some of the hoppers.

According to the present invention, an operator of the combination weighing apparatus delivers articles onto the supply buckets being circulated along the transport path. On the other hand, the articles within the supply buckets being circulated are successively supplied onto the weighing hoppers. Accordingly, the operator need not deliver the articles directly onto the weighing hoppers.

More specifically, since a bucket conveyor is employed so as to extend along the rectilinear row of the weighing hoppers so that the articles can be discharged by the effect of a gravitational force onto the weighing hoppers from the supply buckets being circulated, the articles can be quickly supplied from the plural supply buckets onto the weighing hoppers. Accordingly, a high speed feature, i.e., reduction of the supply cycle can be achieved. Also, if the shape of each of the supply buckets is tailored to represent a shape similar to that of the articles being handled, the combination weighing apparatus of the present invention can handle the elongated articles. Also, since the supply buckets are circulated along the transport path, the position at which the articles are successively delivered onto the supply buckets can advantageously be fixed at a predetermined site, the operator need not look around which would otherwise be required if manual delivery is performed as hereinbefore discussed, eliminating the possible error in delivery of the articles and also allowing a separate supply device to be used for automatic delivery.

In one preferred embodiment of the present invention the determining means may be operable to determine that, when some of the hoppers are empty, such some of the hoppers are ready to receive the articles therein, but when some of the hoppers are not empty, such some of the hoppers are incapable of receiving the articles therein.

In another preferred embodiment of the present invention, the discharge control means may be operable to cause the supply buckets to undergo a discharge operation when the supply buckets, regardless of whether or not they contain articles therein, are successively brought to the position corresponding to some of the hoppers not containing the articles therein, but to cause the supply buckets to undergo no discharge operation when the supply buckets are successively brought to a position corresponding to some of the hoppers containing the articles therein.

In either case, neither detection of whether or not the supply buckets contain articles therein nor a tracking control is needed and, accordingly, the control can be easily and simply performed.

In a further preferred embodiment of the present invention, the combination weighing apparatus of the present invention may further include a weight detector for detecting a weight of each of the hoppers onto which the article is to be discharged from the supply unit.

The determining means when receiving an output from the weight detector may preferably determine whether or not the weight of the article within the respective hopper is not greater than a predetermined threshold value, and wherein the discharge control means operates, when the supply buckets are successively brought to a position corresponding to some of the hoppers containing the respective articles of the weight not greater than the predetermined threshold value, to cause the supply buckets to discharge the corresponding articles onto such some of the hoppers.

Where the weight detector is employed, it is possible to reduce the number of the supply buckets which move idle without the articles delivered thereonto and, accordingly, the workability of the combination weighing apparatus can advantageously be increased.

Preferably, the predetermined threshold value is a value equal to a combination target value less a standard weight for a predetermined discharge unit.

In one embodiment of the present invention, the discharge control means may cause the supply buckets, regardless of whether or not they contain the articles therein, to undergo the discharge operation when the supply buckets are successively transported to a position corresponding to empty hoppers, and also may cause some of the supply buckets, when the latter contain the article of the weight not greater than the predetermined threshold value, to undergo the discharge operation to discharge the articles therefrom onto such hoppers.

Also, the discharge control means is preferably employed for each of the hoppers.

In a further preferred embodiment of the present invention, the supply buckets are preferably spaced from each other at intervals of a predetermined first pitch and the hoppers are also spaced from each other at intervals of a predetermined second pitch, wherein the first and second pitches are equal to each other.

Where the pitch between the neighboring supply buckets and the pitch between the neighboring weighing hoppers are equal to each other, the timings at which the articles are discharged from each supply bucket onto the associated weighing hopper by the effect of a gravitational force need not be controlled one another and it is sufficient for some of the supply buckets which have to discharge the articles to undergo the discharge operation simultaneously, the control of the timings can be achieved easily.

Also, each of the supply buckets is preferably formed so as to elongate in a direction perpendicular to a direction of circulation thereof, so that the elongated articles within the selected weighing hoppers can be grouped together by combining some of the weighing hoppers while the elongated articles are aligned with the supply buckets.

The present invention in accordance with another aspect thereof provides a combination weighing system. This system includes the combination weighing apparatus of a type discussed above; a front stage supply device positioned upstream of the combination weighing apparatus with respect to a direction of delivery of articles for delivering the articles successively onto the supply unit; article detecting means for detecting presence or absence of the article in the supply buckets before each of the supply buckets receives the articles from the front stage supply device; and a front stage control means operable on a basis of article detection information from the article detecting means to control supply of the articles from the front stage supply device towards the supply unit.

According to the combination weighing system of the kind described above, the provision of the front stage supply device is effective to eliminate the necessity of an operator to deliver the articles onto the supply buckets, thereby resulting in increase of the workability.

In accordance with a further aspect of the present invention, there is also provided a combination weighing system which includes the combination weighing apparatus of the kind described hereinbefore; a front stage supply device positioned upstream of the combination weighing apparatus with respect to a direction of delivery of articles for delivering the articles successively onto the supply unit; and discharge means for causing the supply buckets to undergo the discharge operation when the supply buckets are brought to a discharge position defined at a location downstream of one of the hoppers that is positioned most downstream of the path of circulation of the supply buckets. The front stage supply device delivers the articles onto the supply buckets which have undergone the discharge operation.

According to the second mentioned combination weighing system, since at a position upstream of the front stage supply device the articles are discharged from the supply buckets so that the supply buckets can be emptied at all times, it is possible to prevent each of the supply buckets from receiving an excessive amount of articles.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a schematic front view, on an enlarged scale, showing a supply unit and a combining unit used in the combination weighing apparatus of FIG. 1A;

FIG. 3 is a schematic side view of one of supply buckets used in the combination weighing apparatus of FIG. 1A;

DETAILED DESCRIPTION OF THE EMBODIMENTS

Figure 1A:
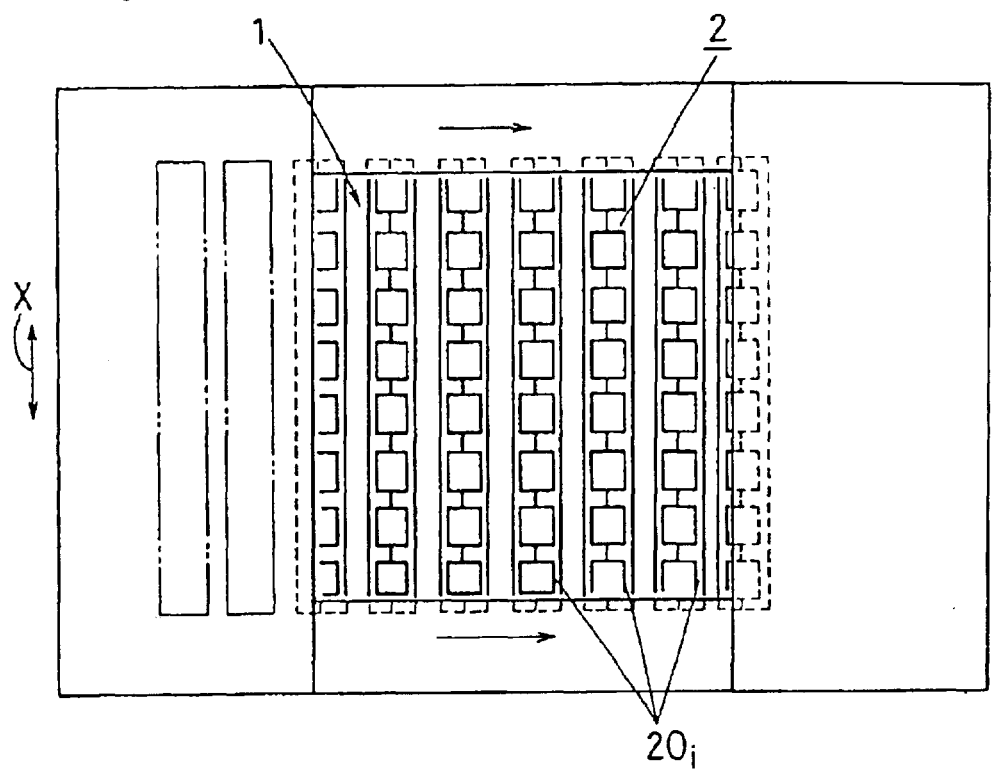
FIG. 1A is a schematic top plan view of a combination weighing apparatus according to a first preferred embodiment of the present invention.
Figure 1B:
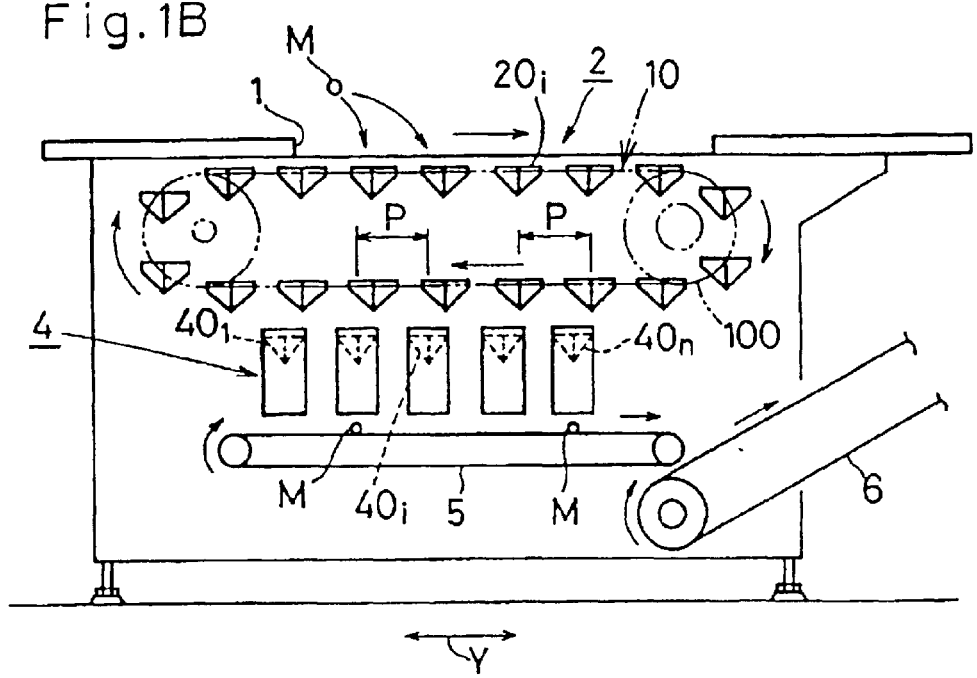
FIG. 1B is a schematic front sectional view of the combination weighing apparatus shown in FIG. 1A.

A combination weighing apparatus according to a first preferred embodiment of the present invention will be described with reference to FIGS. 1A to 4. As best shown in Fig. 1B, the combination weighing apparatus includes a supply unit 2 and a combining unit 4 disposed beneath the supply unit 2. As shown in FIG. 1A, the combination weighing apparatus has a top surface, a portion of which is opened to define a supply mouth 1 through which articles M are successively delivered onto the supply unit 2. The supply unit 2 includes a plurality of supply buckets 20i and is, when an operator delivers the articles M such as, for example, bundles of scallions onto the supply buckets 20i of the supply unit 2 through the supply mouth 1, operable to transport the articles M towards the combining unit 4 in a manner as will be described later.

The combining unit 4 shown in FIG. 1B is operable to discharge the articles M onto a collecting conveyor 5 disposed therebelow after the articles M supplied thereto by means of the supply buckets 20i have been weighed and some of the articles within selected ones of weighing hoppers as will be described later have been grouped together. The collecting conveyor 5 is in the form of an endless conveyor and the articles transported by the collecting conveyor 5 are subsequently delivered onto a delivery conveyor 6. The articles M which have been grouped together are successively delivered downstream from the delivery conveyor 6.

The details of the combining unit 4 will now be described.

Figure 4:
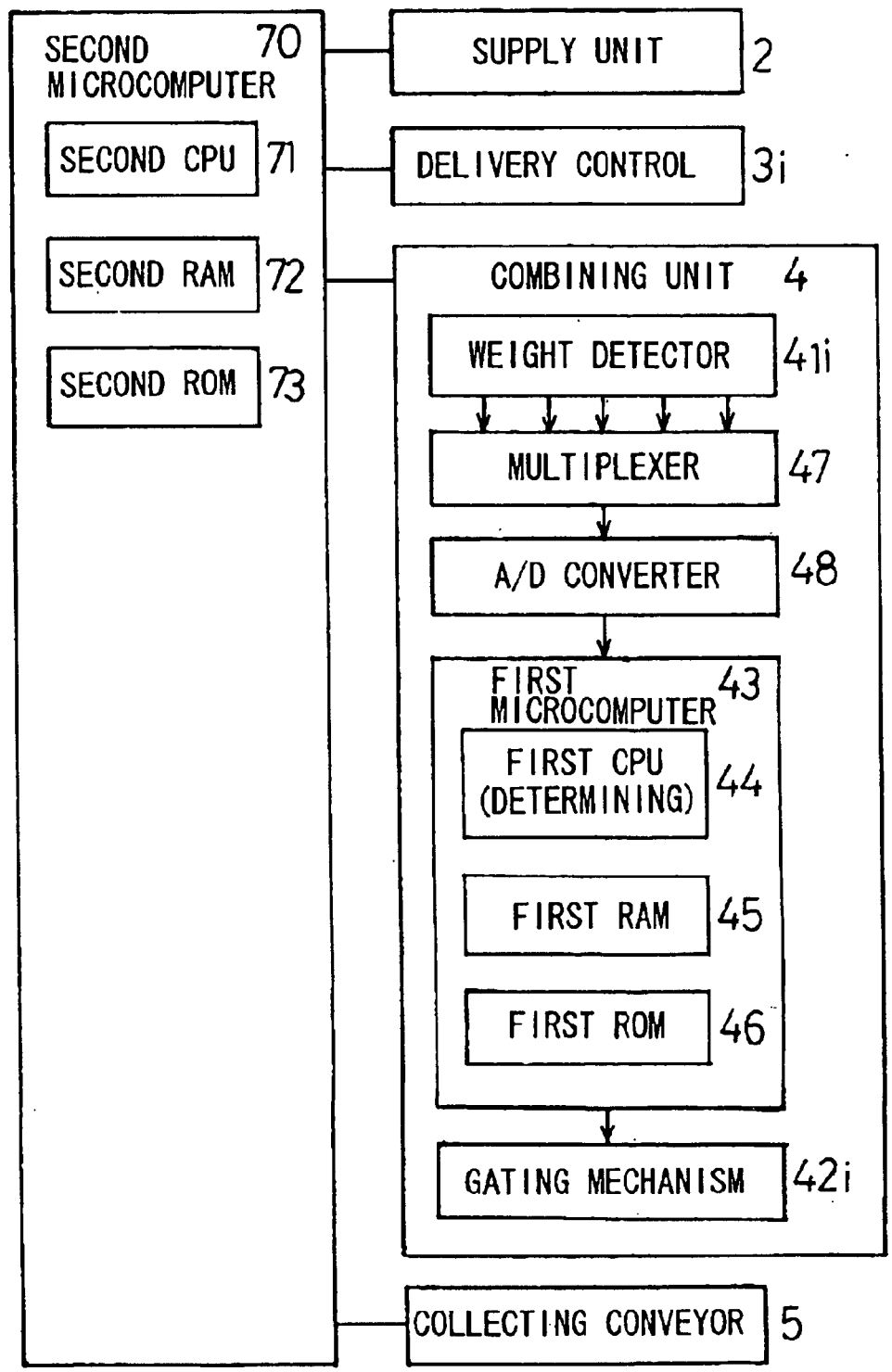
FIG. 4 is a schematic diagram showing a control system used in the combination weighing apparatus of FIG. 1A.

As shown in FIG. 2, the combining unit 4 includes a plurality of weighing hoppers 40i arranged in a row extending in a direction Y longitudinally of the weighing apparatus and parallel to the direction of travel of the supply buckets 20i. The weighing hoppers 40i are spaced an equal distance from each other at intervals of a pitch indicated by P. For each weighing hopper 40i, the combining unit 4 includes a weight detector (load cell ) 41i and a gate drive mechanism 42i as shown in FIG. 4.

Each of the weight detector 41i is operable to measure the weight of the articles M in the form as accommodated within the corresponding weighing hopper 40i and provides a detected weight signal to a multiplexer 47. The multiplexer 47 does in turn outputs a weight signal to an analog-to-digital (A/D) converter 48 in response to a predetermined synchronizing signal applied thereto. The A/D converter 48 converts the weight signal into a digital weight signal representing a weighted value which is subsequently outputted to a first microcomputer 43 forming a part of the combining unit 4.

The first microcomputer 43 is operable to calculate a combination calculated value Wc which is a combination of one or more weighted values, to compare the combination calculated value Wc with a predetermined combined target value Tc and finally to determine a combination of the articles that result in the combination calculated value Wc which is not smaller than the combined target value Tc and not greater than an upper limit, that is, within a predetermined weight tolerance, but which is closest to the combined target value Tc. The first microcomputer 43 forming a part of the combining unit 4 instructs the gate drive mechanism 42i to open some of the weighing hoppers 40i (FIG. 2), which have participated in the combination calculation, so that the articles within such some of the weighing hoppers 40i can be discharged onto the collecting conveyor 5 by the effect of a gravitational force.

It is to be noted that although the number of the weighing hoppers 40i employed is generally within the range of 8 to 10, the respective numbers of the supply buckets 20i and the weighing hoppers 40i are reduced in the illustrated embodiment for the sake of brevity.

The details of the supply conveyor 2 which forms the core of the present invention will now be described. The supply unit 2 shown in FIG. 2 includes a plurality of supply buckets 20i each capable of discharging articles M onto the weighing hoppers 40i positioned therebelow. These supply buckets 20i are supported by an endless support member 10. This endless support member 10 may include a pair of endless chains each positioned adjacent to and drivingly coupled with one of opposite ends of the supply buckets 20i. The supply buckets 20i so supported are spaced an equal distance from each other at intervals of a predetermined pitch P that is equal to the pitch P between the neighboring weighing hoppers 40i.

The support member 10 is trained around and between sprockets 100 and is driven in one direction at a predetermined speed by a drive motor (not shown) that is drivingly coupled with one of the sprockets 100 in any known manner. The drive motor and the support member 10 altogether constitute a bucket transport means for circulating the supply buckets 20i successively past a receiving position, aligned with the supply mouth 1, and a discharge position, immediately above the row of the weighing hoppers 40i, in the same posture at all times regardless of whether the supply buckets 20i move together with an upper run of the support member 10 or whether they move together with a lower run of the support member 10.

Each of the supply bucket 20i includes a cage opening upwardly and made up of cage halves 22 and 22. The cage halves 22 and 22 of each supply bucket 20i are supported by the support member 10 for rotation about respective axes O between opened and closed positions. As shown in FIG. 1A and 3, each of the supply buckets 20i is formed so as to elongate in a direction transverse to the direction of circulation of the supply buckets 20i, and each of the cage halves 22 and 22 has its bottom portion configured to represent a comb shape.

Similarly, each of the weighing hoppers 40i is formed so as to elongate in a direction transverse to the direction of circulation of the supply buckets 20i and has its bottom portion configured to represent a comb shape.

Each of the supply buckets 20i is selectively opened and closed by a gating mechanism which will now be described.

As best shown in FIG. 2, the cage halves 22 and 22 of each supply bucket 20i has respective sector-shaped gears 21 and 21 secured thereto. Each of the sector-shaped gears 21 and 21 has an arcuate portion formed with a plurality of gear teeth (not shown) and the sector-shaped gears 21 and 21 in each supply bucket 20i are meshed with each other. A coil spring 26, for example, is secured at its opposite ends to the cage halves 22 and 22 of each supply bucket 20i so as to straddle between these cage halves 22 and 22.

On the other hand, a discharge control means 3i employed for each weighing hopper 40i for opening the respective supply bucket 20i is positioned above the respective weighing hopper 40i. This discharge control means 3i includes a lift frame 30i, supported for movement up and down, and a guide roller 31 mounted on an upper portion of the lift frame 30i. When the lift frame 30i is lowered at a predetermined timing as will be described later, the guide roller 31 of the lift frame 30i then lowered is brought into contact with the sector-shaped gears 21 and 21 of the cage halves 22 and 22 then moving underneath such guide roller 31, causing the sector-shaped gears 21 and 21 to pivot in respective directions counter to each other against a restoring force of the associated coil spring 26 to thereby cause the associated cage halves 22 and 22 to open with the articles in the associated supply bucket 20i consequently discharged onto the weighing hopper 40i.

When the lift frame 30i once lowered is lifted with the guide roller 31 disengaged from the sector-shaped gears 21 and 21 as the associated bucket 20i move, the cage halves 22 and 22 are closed together by the effect of the restoring force of the coil spring 26.

Hereinafter, a control system for the combination weighing apparatus according to the present invention will be described.

As shown in FIG. 4, the first microcomputer 43 includes a first central processing unit (CPU) (a determining means) 44, a first random access memory (RAM) 45 and a first read only memory (ROM) 46. The first central processing unit 44 can recognize the weight of the article within the weighing hopper 40i in reference to the detected weight signal supplied from the weight detector 41i and, in the illustrated embodiment, determines whether or not the article M can be received depending on whether or not the weighing hopper 40i is empty. In other words, the first central processing unit 44 determines that some of the weighing hoppers 40i can be ready to receive the articles if such some of the weighing hoppers 40i are empty, but that some of the weighing hoppers 40i can not receive the articles if such some of the weighing hoppers 40i are not empty.

The supply unit 2, the discharge control means 3i, the combining unit 4 and the collecting conveyor 5 are electrically connected with a second microcomputer 70. So long as some of the weighing hoppers 40i are empty, the combining unit 4 issues to the second microcomputer a supply request signal including machine identification numbers of such empty weighing hoppers 40i.

The second microcomputer 70 includes a second central processing unit (CPU) 71, a second random access memory (RAM) 72 and a second read only memory (ROM) 73. The second microcomputer 70 is operable to perform control of various electric component parts connected electrically therewith.

It is to be noted that the various electric component parts shown in FIG. 4 are connected electrically with each other through interfaces (not shown).

The operation of the combination weighing apparatus to supply the articles will now be described.

When the articles M fall from the weighing hoppers 40i shown in FIG. 1B onto the collecting conveyor 5 and, at the same time, the second microcomputer 70 receives from the first microcomputer 43 of the combining unit 4 a supply request signal corresponding to some of the weighing hoppers which are then empty, the second central processing unit 71 causes the lift frames 30i corresponding to such weighing hoppers 40i to be moved downwardly. Accordingly, as the supply buckets 20i reach the discharge position above the weighing hoppers 40i regardless of whether or not the supply buckets 20i contain the articles with respect to the empty weighing hoppers 40i, the sector-shaped gears 21 and 21 are brought into contact with the guide roller 31, causing the buckets 20i to discharge the articles with the cage halves 22 and 22 opened during a horizontal movement of the supply buckets 20i.

When the discharge operation of the buckets 20i containing the articles is performed and the articles M are actually discharged onto the weighing hoppers 40i, the combining unit 4 is informed by a signal from the weight detector 41i that the articles have been discharged onto the weighing hoppers 40i and then ceases outputting the supply request signal corresponding to the weighing hoppers 40i onto which the articles have been discharged. Upon interruption of the outputting of the supply request signal, the second microcomputer 70 causes the lift frames 30i, corresponding to such weighing hoppers 40i, to be moved upwardly.

On the other hand, where the weighing hoppers 40i contain the articles M, the lift frames 30i corresponding to such weighing hoppers 40i containing the articles will not be lowered and no discharge operation to discharge the articles onto the weighing hoppers 40i will occur even though the supply buckets 20i are transported to positions aligned with those weighing hoppers 40i.

As described above, since the articles M are discharged successively from the supply buckets 20i, then being circulated, onto the weighing hoppers 40i by the effect of a gravitational force, it is possible to supply the articles M from the plural supply buckets 20i onto the weighing hoppers 40i all at a time. Accordingly, it is possible to attain a high speed feature of the apparatus (i.e., to reduce the cycle of article supply).

Also, since the supply buckets 20i and the weighing hoppers 40i are spaced at intervals of substantially the same pitch P, and since all of the supply buckets 20i can discharge the articles simultaneously, the timing at which the articles are discharged need not be controlled for each of the supply buckets 20i, rendering the timing control to be performed easily.

It is, however, to be noted that the lift frames 30i then lowered will not be elevated before outputting of the supply request signal from the weighing hoppers 40i is ceased. For this reason, by the time the combining unit 4 is informed that the articles M have been discharged onto the weighing hoppers 40i, discharge of the articles onto the weighing hoppers 40i takes place regardless of whether or not the supply buckets 20i contain the articles M. Accordingly, there is no need to detect whether or not the supply buckets 20i contain the articles and also to perform a tracking control and, therefore, the control can be achieved simply and easily.

Figure 5:
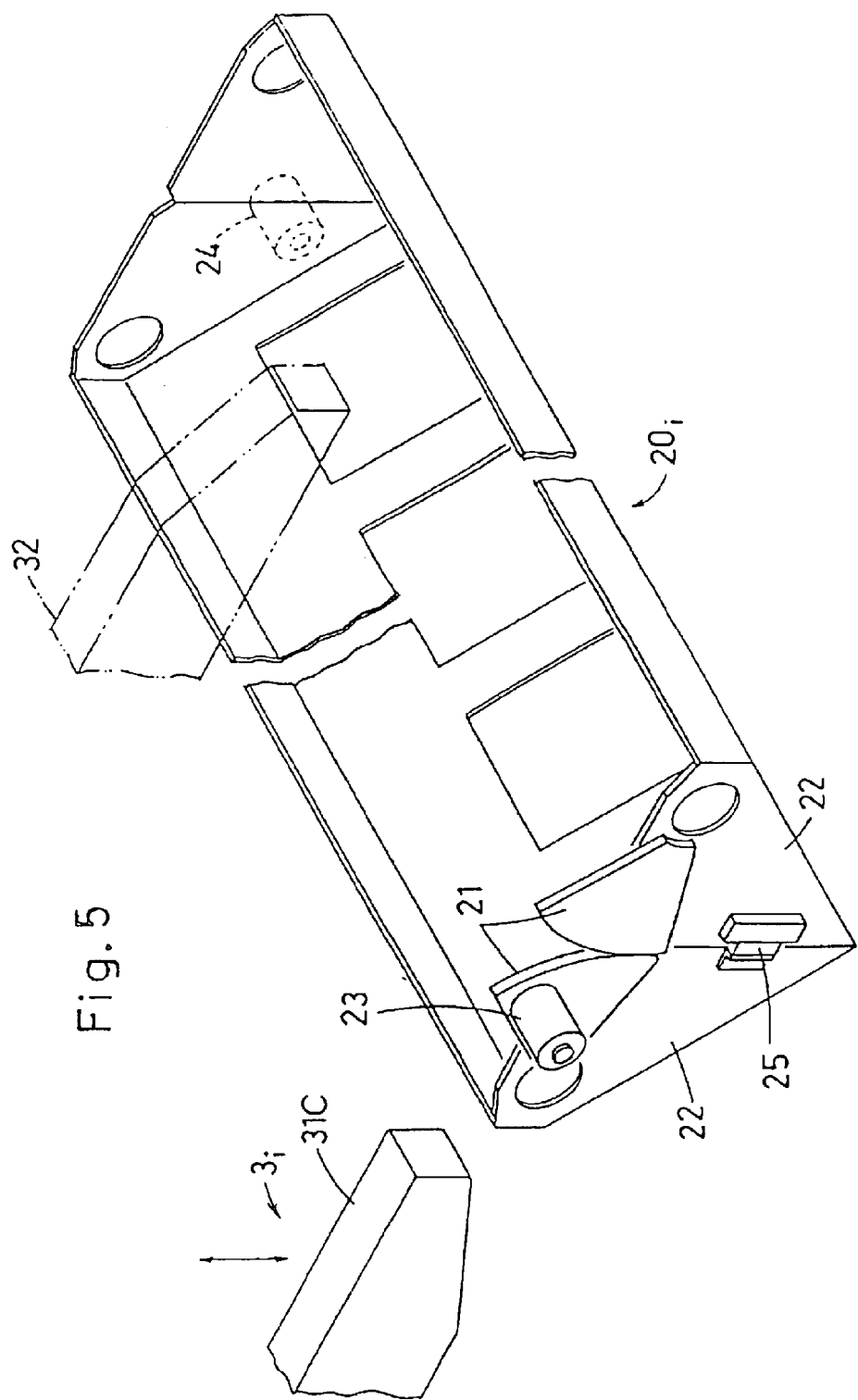
FIG. 5 is a schematic perspective view of a modified form of the supply bucket used in the combination weighing apparatus of the present invention.
Figure 6:
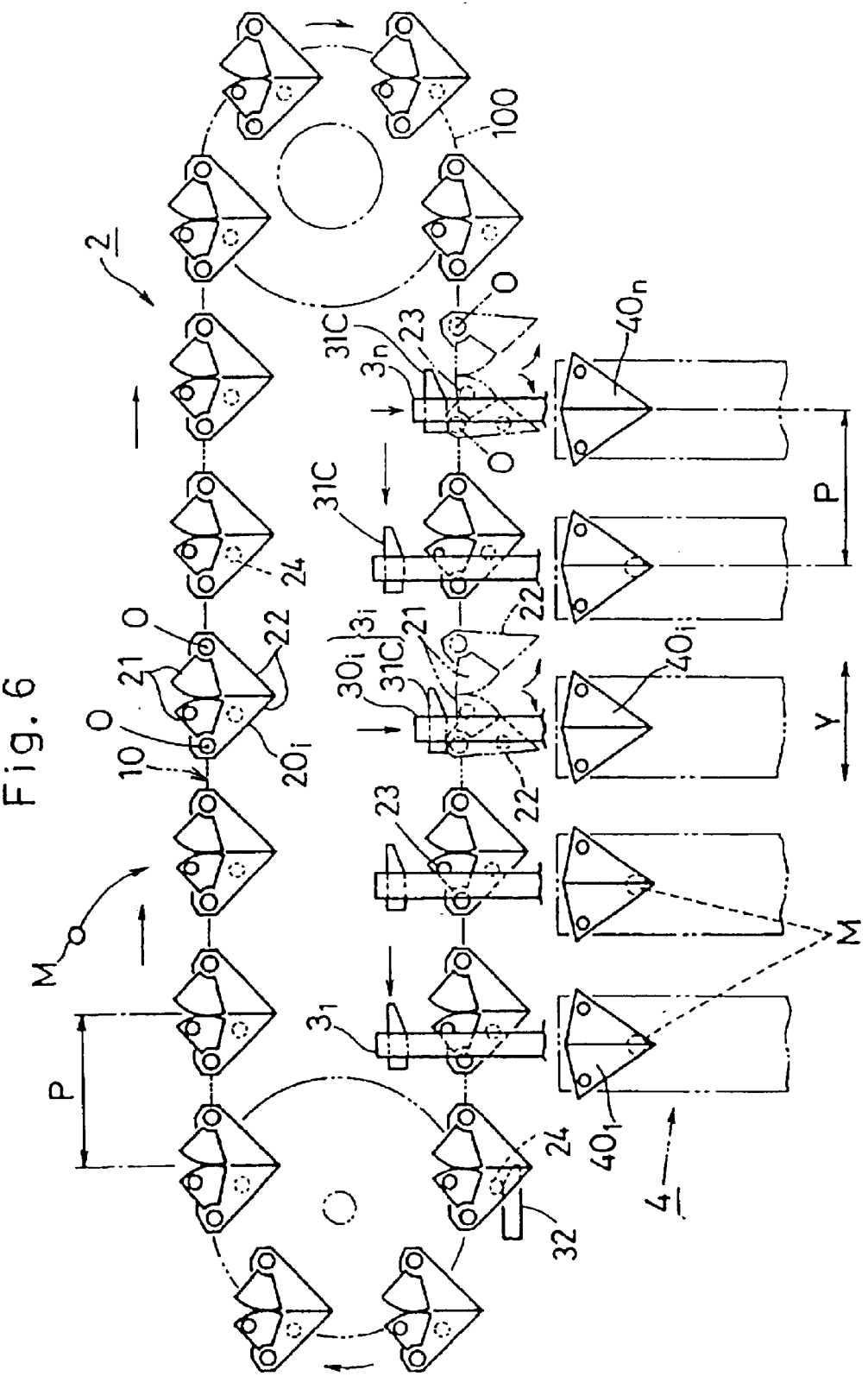
FIG. 6 is a view similar to FIG. 2, showing the combination weighing apparatus of FIG. 5.

Referring now to FIGS. 5 and 6, a modified form of the combination weighing apparatus according to the present invention will be described. As shown in FIG. 5, one of the sector-shaped gears 21 and 21 of each supply bucket 20i is provided with a first contact roller 23. On the other hand, as shown in FIG. 6, each of the left frames 30i has a trigger cam 31C rigidly secured thereto.

When the lift frame 30i is lowered, the trigger cam 31C of the lift frame 30i then lowered is brought into engagement with the first contact roller 23, moving, to thereby drive the sector-shaped gears 21 and 21 in such a direction as to result in opening of the cage halves 22 and 22 with the articles in the associated supply bucket 20i consequently discharged onto the weighing hopper 40i.

It is to be noted that each of the supply buckets 20i is maintained in a closed position by a magnet 25 rigidly secured to one of the cage halves 22 and, accordingly, once the cage halves 22 and 22 have been opened as a result of the engagement of the trigger cam 31C with the first contact roller 23, the cage halves 22 and 22 can be maintained opened by the effect of their own weights.

One of the cage halves 22 and 22 of each supply bucket 20i is provided with a second contact roller 24 as shown in FIG. 5. On the other hand, as shown in FIG. 6, the combination weighing apparatus is provided with a fixed cam 32 for closing the cage halves 22 and 22 as will be described subsequently. The fixed cam 32 is positioned downstream of the row of the weighing hoppers 40i with respect to the direction of travel of the supply buckets 20i. When the supply bucket 20i with its associated cage halves 22 and 22 opened reaches the fixed cam 32 after having passed over the row of the weighing hoppers 40i, the second contact roller 24 is brought into contact with the fixed cam 32 to cause the sector-shaped gears 21 and 21 to pivot in a direction required to close the cage halves 22 and 22 with the cage halves 22 and 22 subsequently held in the closed position by the action of the magnet 25.

It is to be noted that although in the foregoing embodiment it has been possible to receive when the weight of the article within the supply hopper 40i is "0", that is, a threshold value Ws has been set to "0", the threshold value Ws may be a value greater than "0". Also, this threshold value Ws may be stored in the first RAM 45, an example of which will now be described as a second preferred embodiment of the present invention with reference to FIGS. 7A and 7B.

Figures 7A, 7B:
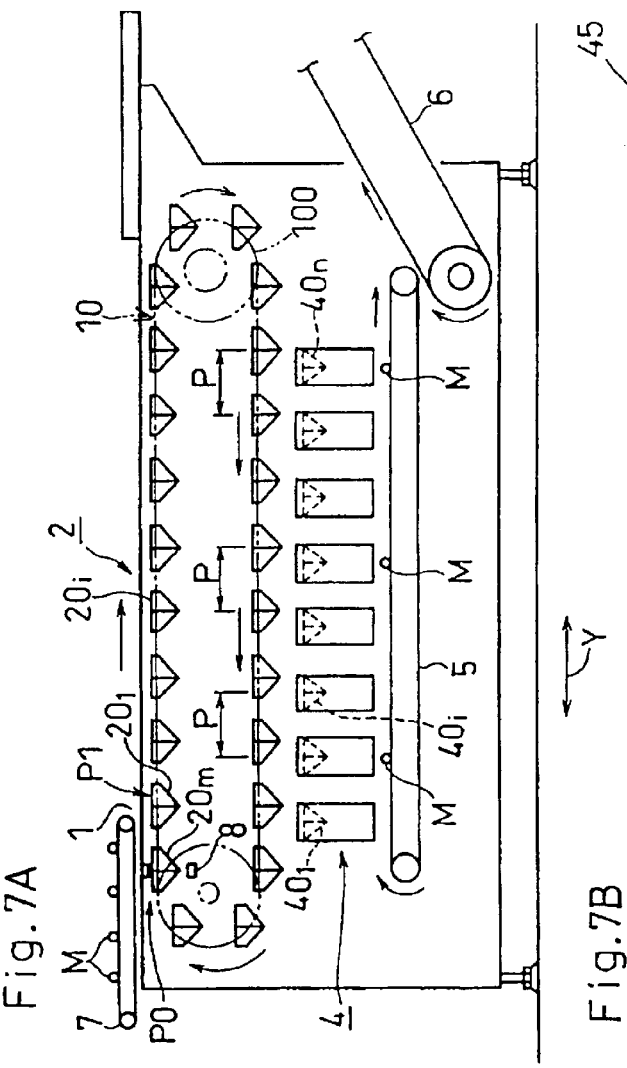
FIG. 7A is a schematic side sectional view of the combination weighing apparatus according to the second preferred embodiment of the present invention.
FIG. 7B is a table showing contents stored in a first random access memory used in the combination weighing apparatus of FIG. 7A.

FIGS. 7A and 7B illustrates the combination weighing apparatus according to a second preferred embodiment of the present invention. As best shown in FIG. 7A, a front stage conveyor (a front stage supply means) 7 is positioned upstream of the supply unit 2 for automatically delivering the articles M successively into the supply buckets $20_1$ then brought to the receiving position P1. A detecting position P0 is defined at a location spaced a distance upstream from the receiving position P1, which distance is equal to one pitch P between the neighboring supply buckets. At this detecting position P0, an article detector (an article detecting means) 8 is disposed for detecting whether or not the article M is contained within the supply bucket 20 m.

Figure 8:
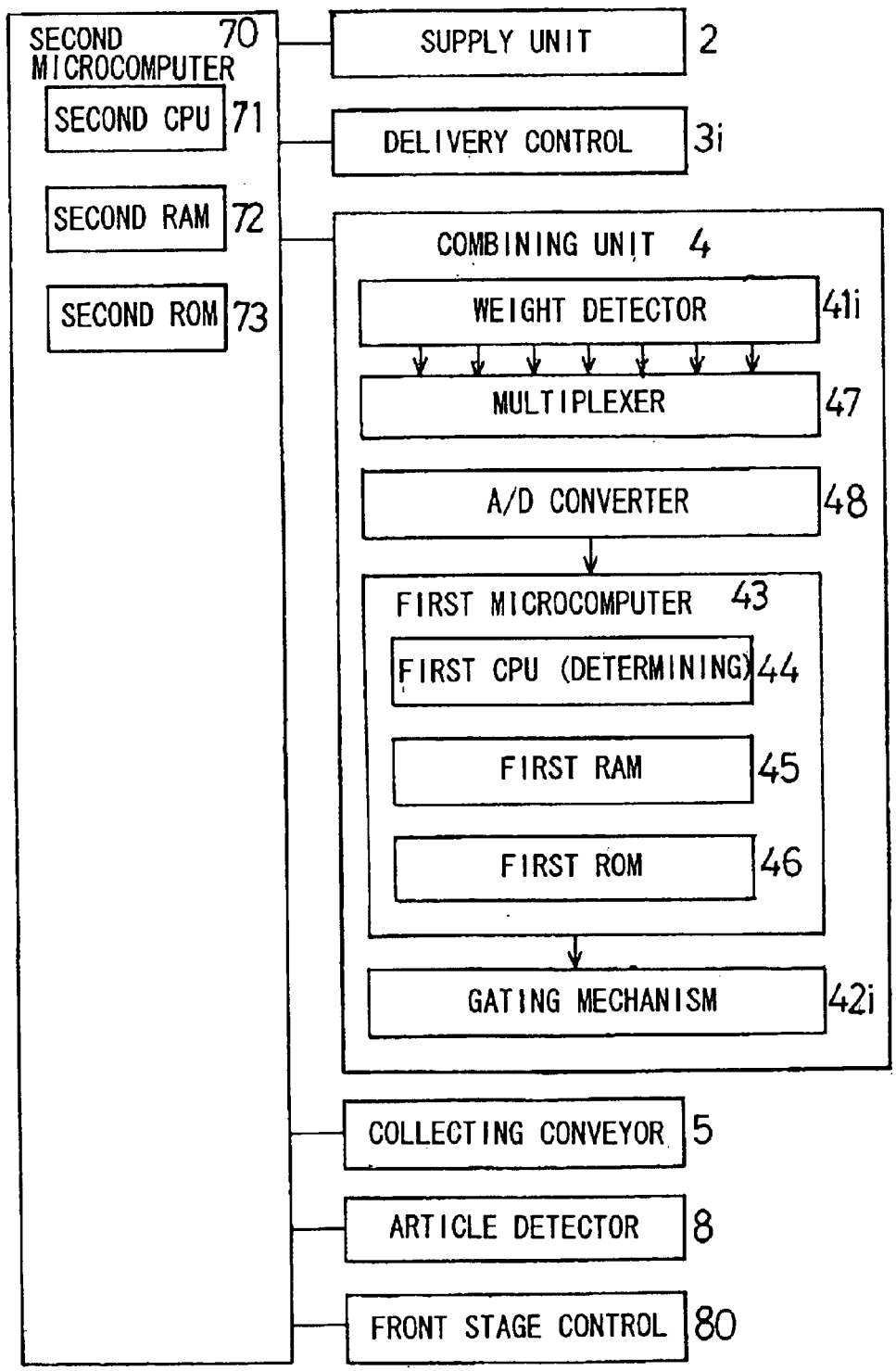
FIG. 8 is a schematic diagram showing the control system used in the combination weighing apparatus of FIG. 7A.

The second microcomputer 70 shown in FIG. 8 when receiving a detection signal (an article detection information) supplied from the article detector 8 is informed of whether or not the supply bucket $20_1$ then moving towards the receiving position P1 contains the article M therein and, in the event that no article M is contained in such supply bucket $20_1$, issues a delivery command to a front stage control means 80 shown in FIG. 8. In response to the delivery command, the front stage control means 80 drives the front stage conveyor 7 so that the article M can be delivered therefrom into the supply bucket $20_1$ at the receiving position P1.

On the other hand, in the event that no articles M are contained in the supply bucket $20_1$, the second microcomputer 70 does not issue a delivery command. Accordingly, in the event that the article M is still contained in the supply bucket $20_1$ then brought to the receiving position P1, no article is delivered thereinto. In this way, the article M can be supplied into the supply buckets 20i one at a time.

A first random access memory (RAM) 45 shown in FIG. 8 stores, for each kind of articles, a combined target value Tc, a standard weight Wa of the article and a threshold value Ws as shown in FIG. 7B. The standard weight Wa referred to above is a standard weight of the article M to be supplied from each of the supply buckets 20i onto the weighing hoppers 40i and, for example, an average weight of a single article is stored in the first RAM 45. The threshold value Ws is a weight that can be calculated from the following equation;

$$Ws=Tc-Wa \quad (1)$$

The first central processing unit (CPU) 44 shown in FIG. 8 compares the weight of the article M within each of the weighing hoppers 40i with the threshold value Ws and causes the article M within the supply bucket 20i to be supplied onto the weighing hopper 40i by the effect of a gravitational force when the supply bucket 20i is transported to a position corresponding to one of the weighing hoppers 40i then containing the article M of a weight not greater than the threshold value Ws.

Hereinafter, the operation to supply the articles in the combination weighing apparatus shown in and described with reference to FIGS. 7A to 8 will be described. When the articles M fall onto the collecting conveyor 5 from the weighing hoppers 40i shown in FIG. 7A and the second microcomputer 70 receives from the first microcomputer 43 of the combining unit 4 a supply request signal corresponding to the empty weighing hopper 40i, the second central processing unit 71 lowers the lift frame 30i corresponding to such weighing hopper 40i. Accordingly, with respect to the empty weighing hopper 40i, regardless of whether or not the supply bucket 20i contains therein the article, the article discharge operation of the supply bucket 20i takes place when the supply bucket 20i reaches a position immediately above the weighing hopper 40i.

The foregoing operation is substantially identical with that taking place in the previously described first embodiment of the present invention.

When after the article discharge operation is carried out with respect to the supply bucket 20i containing the article the article M is actually supplied onto the weighing hopper 40i, the first central processing unit 44 of the combining unit 4 when receiving a signal from the weight detector 41i is informed of the weight of the article M within such weighing hopper 40i. The first central processing unit 44 then performs the next cycle of combination calculation and separates into a group of weighing hoppers that participate in the selected combination and another group of weighing hoppers that do not participate in the selected combination. At the same time, the first central processing unit 44 determines if the weight of the article M within the weighing hopper 40i that falls within the group of the weighing hoppers that do not participate in the selected combination is not greater than the threshold value Ws and, in the event that it is not greater than the threshold value Ws, performs a control so that the article M can be supplied from the supply bucket 20i onto such weighing hopper 40i. Accordingly, one or a plurality of articles M are accommodated within the weighing hopper 40i.

Accordingly, it is possible to avoid circulation of the supply buckets with no article supplied into the weighing hoppers. Also, while in the first embodiment of the present invention, three or four weighing hoppers 40i are selected to discharge the articles, the second embodiment of the present invention is such that if a plurality of articles M are supplied into one weighing hopper 40i, the number of the weighing hoppers selected will decrease down to one or two and, therefore, the number of the weighing hoppers 40i into which the articles M are discharged from the supply buckets 20i can decrease. Consequently, since the weighing hoppers having participated in the current combination do not participate in the subsequent combination calculation, the subsequent cycle of combination calculation can be performed without the number of a population of combinations being reduced, making it possible to increase the workability.

Other structural features of the second embodiment of the present invention than those described above are substantially similar to or identical with those in the first embodiment of the present invention and, therefore, the details thereof are not herein reiterated for the sake of brevity.

Figure 9A:
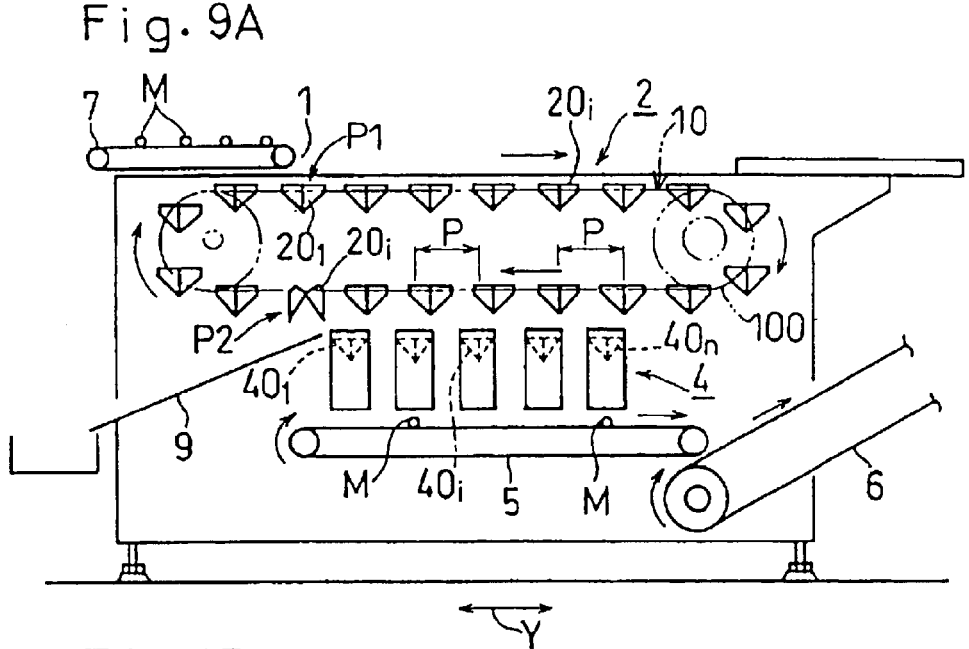
FIG. 9A is a view similar to FIG. 1B, showing the combination weighing apparatus according to a third preferred embodiment of the present invention.
Figure 9B:
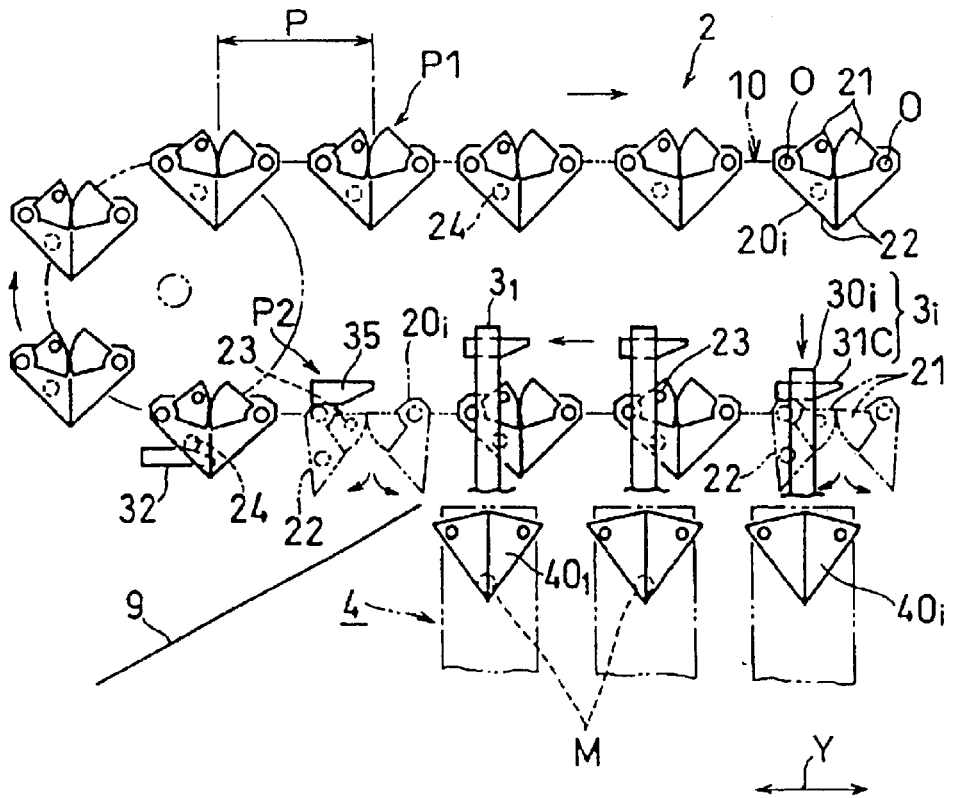
FIG. 9B is a view similar to FIG. 2, showing the supply unit and the combining unit both employed in the combination weighing apparatus of FIG. 9A.

A third preferred embodiment of the present invention is shown in FIGS. 9A and 9B. The combination weighing apparatus according to the third embodiment of the present invention is substantially similar to that described in connection with the second embodiment of the present invention, except that in place of the article detector 8 shown in FIG. 7A, a discharge means as will be described subsequently is employed.

The discharge means referred to above is comprised of a fixed discharge cam 35 and others shown in FIG. 9B. The fixed discharge cam 35 is positioned a discharge position P2 defined downstream of the lower run of the endless support member 10 and also of the most downstream weighing hopper $40_1$, and is operable to open the supply buckets 20i as they pass therebelow one at a time so that the articles within those supply buckets 20i can be discharged therefrom. This fixed discharge cam 30 includes the trigger cam 31C fixedly secured to the combination weighing apparatus as hereinbefore described for opening the cage halves 22 and 22 of each of the supply buckets as the latter are successively brought at the discharge position P2 one at a time.

A discharge chute 9 is disposed immediately below the fixed discharge cam 35 and, hence, the discharge position P2.

The combination weighing apparatus according to the third embodiment of the present invention operates in the following manner.

When each of the supply buckets 20i moving past the most downstream weighing hopper $40_1$ arrives at the discharge position P2, the first contact roller 23 of such supply bucket 20i is brought into contact with the fixed discharge cam 35 and the supply bucket 20i is consequently opened at the discharge position P2. Accordingly, each of the supply buckets 20i can be transported towards the receiving position P1 after having been emptied. At the receiving position P1 shown in FIG. 9A, the article M can be delivered from the front stage conveyor 7 into the empty supply bucket 20i.

Other structural features of the third embodiment of the present invention than those described above are substantially similar to or identical with those in the second embodiment of the present invention and, therefore, the details thereof are not herein reiterated for the sake of brevity. It is, however, to be noted that even in the third embodiment, the article detector 8 shown in FIG. 7A may be employed in anticipation of the possibility that the article will not be discharged at the discharge position P2.

Thus, according to the third embodiment of the present invention, since all of the supply buckets 20i successively moving towards the receiving position P1 are emptied, there is no possibility that a number of articles M may be accumulated within the supply buckets 20i.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, as a method of supplying the article into each of the supply buckets, although the article may be supplied into the respective supply bucket by an operator, but the use may be made of a separate supply feeder so that the article can be supplied into each of the supply buckets through the supply feeder.

Also, while each of the supply buckets has been shown and described as including the cage halves that can be selectively opened or closed, the respective supply bucket may be of a design in which the article within the supply bucket can be discharged when turned upside down. In addition, although each of the supply buckets may be in the form of a container, it may be formed so as to represent a comb shape where the articles handled thereby is an elongated article.

The discharge control means referred to hereinbefore may be of a design capable of selectively opening or closing a gate of each of the supply buckets or of a design capable of turning each of the supply buckets upside down.

The articles with which the combination weighing apparatus embodying the present invention may not be always limited to the elongated articles.

Yet, the direction of circulation of the supply buckets may lie horizontally. In other words, arrangement may be made so that the articles are discharged onto the weighing hoppers while the supply buckets are successively transported vertically, and the articles are successively supplied onto the supply buckets while the latter are transported in a direction reverse thereto after having been turned around.

Furthermore, the weighing hoppers may be arranged in two rows, in which case two rows of bucket conveyors should correspondingly be employed.

Each of the supply buckets may have an inner surface lined with a cushioning material and/or may be waterproofed.

The combining unit and the apparatus as a whole may be controlled by a single microcomputer, without being subjected to a decentralized processing.

Accordingly, such changes and modifications are, unless they depart from the scope of the present invention as delivered from the claims annexed hereto, to be construed as included therein.

What is claimed is:

1. A combination weighing apparatus for weighing articles supplied to a plurality of hoppers, arranged in a rectilinear row, from a supply unit, combining some of the hoppers and grouping together the articles within selected ones of the hoppers, wherein the supply unit comprises:

a plurality of supply buckets each capable of accommodating an article therein and discharging it onto any one of the hoppers;

transport means including an endless support member for drivingly supporting the supply buckets and operable to circulate the supply buckets along a predetermined path together with the support member past a discharge position above the row of the hoppers;

determining means for determining, in reference to a weight of the article within each of the hoppers, whether or not the respective hopper is ready to receive the article; and discharge control means for, when the supply buckets are successively brought to a position corresponding to some of the hoppers ready to receive the articles therefrom, causing the supply buckets to discharge the corresponding articles onto such some of the hoppers;

wherein the plurality of supply buckets are arranged in a row substantially parallel to the row of hoppers.

2. The combination weighing apparatus as claimed in claim 1, wherein the determining means is operable to determine that, when some of the hoppers are empty, such some of the hoppers are ready to receive the articles therein, but when some of the hoppers are not empty, such some of the hoppers are incapable of receiving the articles therein.

3. The combination weighing apparatus as claimed in claim 1, wherein the discharge control means is operable to cause the supply buckets to undergo a discharge operation when the supply buckets, regardless of whether or not they contain articles therein, are successively brought to the position corresponding to some of the hoppers not containing the articles therein, but to cause the supply buckets to undergo no discharge operation when the supply buckets are successively brought to a position corresponding to some of the hoppers containing the articles therein.

4. The combination weighing apparatus as claimed in claim 1, further comprising a weight detector for detecting a weight of each of the hoppers onto which the article is to be discharged from the supply unit.

5. A combination weighing apparatus for weighing articles supplied to a plurality of hoppers, arranged in a rectilinear row, from a supply unit, combining some of the hoppers and grouping together the articles within selected ones of the hoppers, wherein the supply unit comprises:
a plurality of supply buckets each capable of accommodating an article therein and discharging it onto the hoppers, said plurality of supply buckets being positioned along the array of the plurality of hoppers;
transport means including an endless support member for drivingly supporting the supply buckets and operable to circulate the supply buckets along a predetermined path together with the support member past a discharge position above the row of the hoppers;
determining means for determining, in reference to a weight of the article within each of the hoppers, whether or not the respective hopper is ready to receive the article;
a weight detector for detecting a weight of each of the hoppers onto which the article is to be discharged from the supply unit; and
discharge control means for, when the supply buckets are successively brought to a position corresponding to some of the hoppers ready to receive the articles therefrom, causing the supply buckets to discharge the corresponding articles onto such some of the hoppers, wherein the determining means when receiving an output from the weight detector determines whether or not the weight of the article within the respective hopper is not greater than a predetermined threshold value, and wherein the discharge control means operates, when the supply buckets are successively brought to a position corresponding to some of the hoppers containing the respective articles of the weight not greater than the predetermined threshold value, to cause the supply buckets to discharge the corresponding articles onto such some of the hoppers.

6. The combination weighing apparatus as claimed in claim 5, wherein the predetermined threshold value is a value equal to a combination target value less a standard weight for a predetermined discharge unit.

7. The combination weighing apparatus as claimed in claim 5, wherein the discharge control means causes the supply buckets, regardless of whether or not they contain the articles therein, to undergo the discharge operation when the supply buckets are successively transported to a position corresponding to empty hoppers, and also causes some of the supply buckets, when the latter contain the article of the weight not greater than the predetermined threshold value, to undergo the discharge operation to discharge the articles therefrom onto such hoppers.

8. The combination weighing apparatus as claimed in claim 1, wherein the discharge control means is employed for each of the hoppers.

9. The combination weighing apparatus as claimed in claim 1, wherein the supply buckets are spaced from each other at intervals of a predetermined first pitch and the hoppers are also spaced from each other at intervals of a predetermined second pitch, said first and second pitches being equal to each other.

10. The combination weighing apparatus as claimed in claim 1, wherein each of the supply buckets is formed to elongate in a direction perpendicular to a direction of circulation thereof.

11. A combination weighing system which comprises:
a combination weighing apparatus as defined in claim 1;
a front stage supply device positioned upstream of the combination weighing apparatus with respect to a direction of delivery of articles for delivering the articles successively onto the supply unit;
article detecting means for detecting presence or absence of the article in the supply buckets before each of the supply buckets receives the articles from the front stage supply device; and
a front stage control means operable on a basis of article detection information from the article detecting means to control supply of the articles from the front stage supply device towards the supply unit.

12. A combination weighing system which comprises:
a combination weighing apparatus as defined in claim 1,
a front stage supply device positioned upstream of the combination weighing apparatus with respect to a direction of delivery of articles for delivering the articles successively onto the supply unit; and
discharge means for causing the supply buckets to undergo the discharge operation when the plurality of supply buckets are brought to a discharge position defined at a location downstream of one of the plurality of hoppers that is positioned most downstream of the path of circulation of the plurality of supply buckets;
said front stage supply device delivering the articles onto the plurality of supply buckets which have undergone the discharge operation.

13. A combination weighing apparatus for weighing articles supplied to a plurality of hoppers, arranged in a rectilinear row, from a supply unit, combining some of the hoppers and grouping together the articles within selected ones of the hoppers, wherein the supply unit comprises:
a plurality of supply buckets each capable of accommodating an article therein and discharging it onto the hoppers;
transport means including an endless support member for drivingly supporting the supplying buckets and operable to circulate the supply buckets along a predetermined path together with the support member past a discharge position above the row of the hoppers;
determining means for determining, in reference to a weight of the article within each of the hoppers, whether or not the respective hopper is ready to receive the article;
discharge control means for, when the supply buckets are successively brought to a position corresponding to some of the hoppers ready to receive the articles therefrom, causing the supply buckets to discharge the corresponding articles onto such some of the hoppers; and a weight detector for detecting a weight of each of the hoppers onto which the article is to be discharged from the supply unit, wherein the determining means when receiving an output from the weight detector determines whether or not the weight of the article within the respective hopper is not greater than a predetermined threshold value, and wherein the discharge control means operates, when the supply buckets are successively brought to a position corresponding to some of the hoppers containing the respective articles of the weight not greater than the predetermined threshold value, to cause the supply buckets to discharge the corresponding articles onto such some of the hoppers.

14. The combination weighing apparatus as claimed in claim 13, wherein the predetermined threshold value is a value equal to a combination target value minus a standard weight for a predetermined discharge unit.

15. The combination weighing apparatus as claimed in claim 13, wherein the discharge control means causes the supply buckets, regardless of whether or not they contain the articles therein, to undergo the discharge operation when the supply buckets are successively transported to a position corresponding to empty hoppers, and also causes some of the supply buckets, when the latter contain the article of the weight not greater than the predetermined threshold value, to undergo the discharge operation to discharge the articles therefrom onto such hoppers.

* * * * *

UNITED STATES PATENT AND TRADEMARK OFFICE
CERTIFICATE OF CORRECTION

PATENT NO. : 6,787,712 B2
DATED : September 7, 2004
INVENTOR(S) : Yoshiharu Asai et al.

It is certified that error appears in the above-identified patent and that said Letters Patent is hereby corrected as shown below:

Column 8,
Line 59, after "23," insert -- then --.

Signed and Sealed this

Eighth Day of February, 2005

JON W. DUDAS
*Director of the United States Patent and Trademark Office*